July 12, 1927.
I. MILLER
1,635,723
MORTISING MACHINE
Filed Dec. 23, 1925
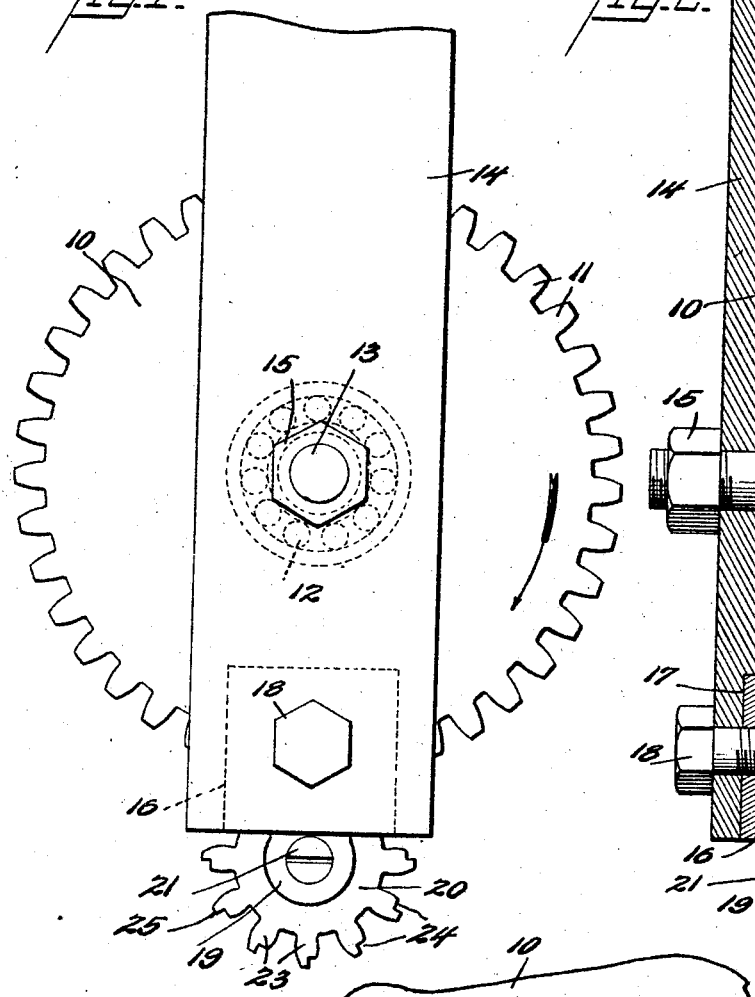
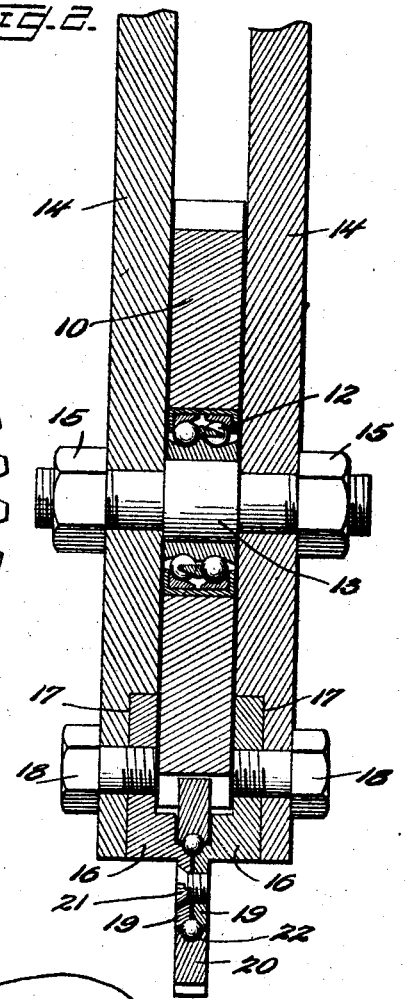
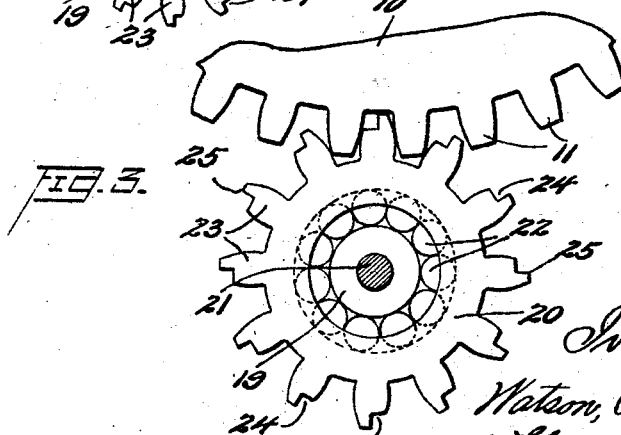
Inventor
Ivan Miller,
Watson, Coit, Morse
& Grindle. Attorney Patented July 12, 1927.

1,635,723

UNITED STATES PATENT OFFICE.

IVAN MILLER, OF ONAWAY, MICHIGAN, ASSIGNOR TO LOBDELL-EMERY MANUFACTURING COMPANY, OF ALMA, MICHIGAN, A CORPORATION OF MICHIGAN.

MORTISING MACHINE.

Application filed December 23, 1925. Serial No. 77,406.

This invention relates to milling or mortising machines of the type adapted to cut a mortise deeper than the radius of the cutter as illustrated, for instance, in U. S. Patents No. 261,049 and No. 618,585. One object of the present invention is to provide a mortising cutter by means of which a deep and narrow groove or mortise may be formed. A second object is to provide a cutter adapted to be driven by a spur gear having axially symmetrical teeth of standard type, the cutter being in the form of a pinion having teeth which are symmetrical, excepting as to the cutting edge, and which are otherwise of standard contour adapted to intermesh with the teeth of the spur gear. Another object is to provide a bearing or support for the rotary cutter which is substantially as thick axially as the width of the cutting face whereby a support of maximum strength is afforded for the cutter without interfering with its operation in cutting a mortise which is deeper than the radius of the cutter.

The invention is illustrated in the accompanying drawings in which:

Fig. 1 is a side view of a cutter and its driving gear mounted in suitable supports;

Fig. 2 is a vertical central section through the axes of the gear and cutter shown in Figure 1; and Fig. 3 is a side view of the cutter and a portion of the driving gear.

Referring to the drawing 10 indicates a spur driving gear having radial symmetrical teeth 11 of standard outline. As shown the gear is mounted on an anti-friction bearing 12 supported on a fixed shaft 13. The shaft 13 is carried by supports 14 of any suitable character. The extensions of the shaft 13 pass through the supports and the supports are rigidly clamped between the central and large portion of the shaft 13 and clamping nuts 15. The spur gear 10 rotates freely on the shaft 13 and it may be driven by power through any suitable gearing or connections.

A two-part cutter stock 16 is mounted in the lower ends of the supports 14. As shown each support 14 is recessed at 17 to receive the upper portion of a part of the cutter stock which is securely held in the recess by removable screws 18. Each part of the cutter stock has a downward extension 19 constituting a half-bearing for the mortising cutter 20. As shown these bearing parts 19 are rigidly connected by a screw 21. The bearing parts 19 together form a ball race to receive a row of anti-friction balls 22, the cutter 20 having a complementary ball race.

The construction described permits of the use of the cutters of different diameters and different thicknesses. By removing the screws 18 the cutter and cutter stock are removed from the supports 14 and another cutter stock bearing a cutter of different size may be substituted. My invention is particularly adapted for mortising narrow openings and the bearings 19 being of maximum thckness permissible in a mortising machine of this type afford a suitable support for very narrow cutters.

In order to drive the cutter smoothly and without back-lash, and also without injury to the cutting edges, I form the teeth 23 of the cutter in the shape of standard gear teeth excepting that their outer ends are notched on their forward faces as shown at 24, to provide cutting edges 25. In other words, the cutter teeth are radially symmetrical with the exception of the notched portions which provide the cutting edges. The spur gear 10 is driven in the direction of the arrow, Figure 1, which results in the cutter being driven in the right direction. The cutter it will be observed may be used to cut a mortise considerably deeper than the length of its radius. The supports 14 may be a part of any suitable mortising machine and they may be either stationary or movable to carry the cutter toward the work.

Having thus described the invention what is claimed as new and desired to be secured by Letters Patent is:

1. The combination with a driving gear of a mortising cutter adapted to mesh with the gear, the cutter having a two-part bearing, the combined thickness of said parts being substantially the same as the width of the cutter face, said bearing and said cutter having complementary ball races and anti-friction balls arranged in said races, the two parts of said bearing abutting and being secured together.

2. The combination with a spur driving gear having radial symmetrical teeth, of a milling cutter having intermeshing radial symmetrical teeth notched at their outer forward faces to form cutting edges and suitable supports for said gear and cutter, the support for the cutter comprising a two-part bearing of combined thickness not greater than the width of the cutter whereby the cutter is adapted to cut deeper than its axial dimension, said bearing parts abutting and being secured together.

In testimony whereof I hereunto affix my signature.

IVAN MILLER.